INVENTOR
S. DOBA, JR.
BY
*signature*
AGENT

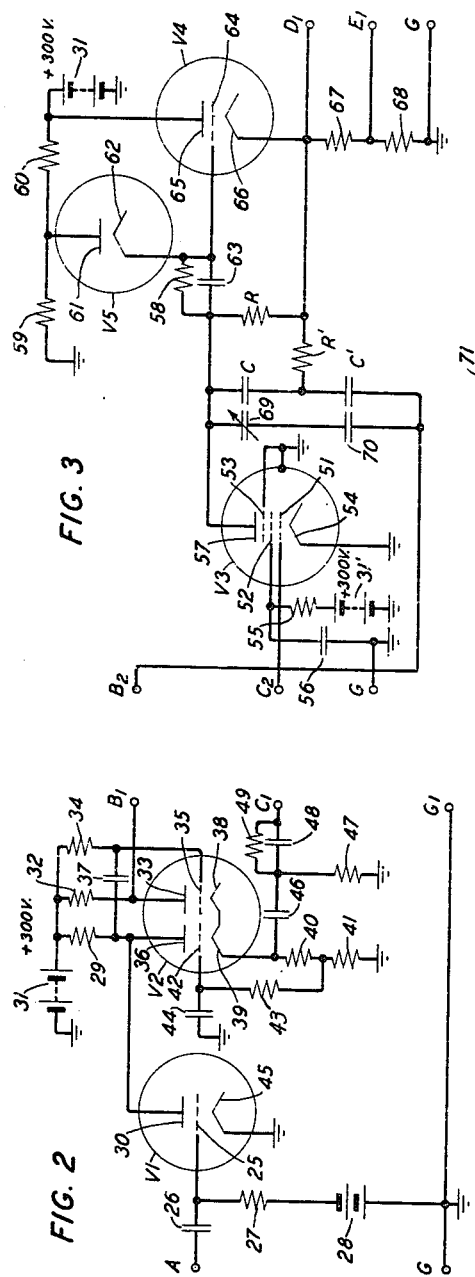

Feb. 1, 1955    S. DOBA, JR    2,701,358
GROUND SPEED AND DISTANCE METER
Filed Nov. 25, 1944    5 Sheets-Sheet 3

INVENTOR
S. DOBA, JR.
BY
D. MacKenzie
AGENT

Feb. 1, 1955 S. DOBA, JR 2,701,358
GROUND SPEED AND DISTANCE METER
Filed Nov. 25, 1944 5 Sheets-Sheet 5
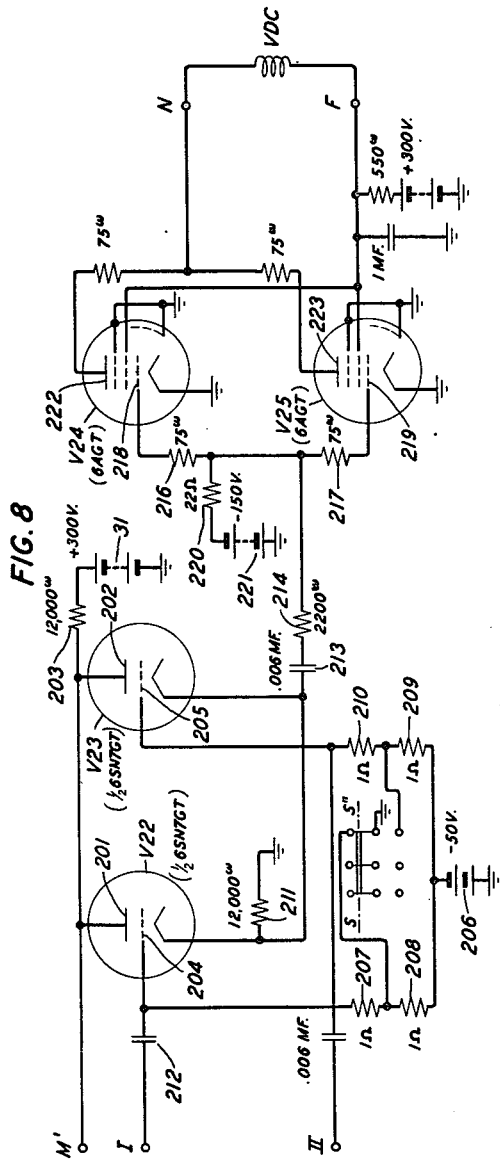
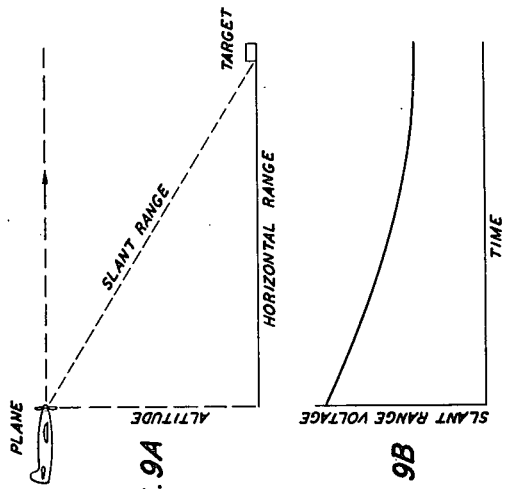
INVENTOR
S. DOBA, JR.
BY
AGENT United States Patent Office 2,701,358
Patented Feb. 1, 1955

2,701,358

GROUND SPEED AND DISTANCE METER

Stephen Doba, Jr., Long Island City, N. Y., assignor to Bell Telephone Laboratories, Incorporated, New York, N. Y., a corporation of New York Application November 25, 1944, Serial No. 565,137

5 Claims. (Cl. 343—9)

This invention relates to an improved method and apparatus for measuring the relative speed of an observer toward or away from an observed object, visible or invisible, and constitutes an improvement over the invention disclosed and claimed in my Patent 2,406,358, issued August 27, 1946, and assigned to the same assignee as the present application.

The application so identified disclosed a method and apparatus for measuring the ground speed of, for example, an airplane approaching a target, but with the limitation that the airplane fly at an altitude sufficiently low that the relative speed in the line joining the airplane and target is not substantially greater than its horizontal component. By the present invention, that limitation is removed and the relative ground speed of two objects, approaching or receding from each other, can be measured regardless of their differences in elevation provided that difference is known, and the general object of the invention is to provide a method and means for such measurement.

Inasmuch as the invention makes use of known electrical object locating and ranging means which are independent of weather and light, another object attained by the invention is the provision of a system of apparatus for measurement of the relative horizontal speed of an observer and object observed capable of successful operation under all conditions of operation.

There is obvious need for such a system in bombing an enemy target from an airplane, therefore another object of the invention is to facilitate the prosecution of war in the air.

It will appear that the invention enables a navigator to measure his horizontal speed with reference to an observed object, whether he is traveling in the air or on the ocean surface, and without error due to incorrect estimate of wind or current, and this is another object of the invention, important in time of peace as well as in war.

For convenience, the invention will be described as it is applied in the case of an airplane approaching a target on the ground, but it will be clear that the utility of the invention is not limited to that case but extends to all situations where relative horizontal speed is to be determined.

The invention will be understood from the following description, read with reference to the accompanying drawings, in which:

Fig. 1 is a block schematic diagram of the major components of the system of the invention;

Figs. 2 to 8 are circuit diagrams representing, respectively, time base generator 24, range sweep generator 50, rate sweep generator 180, range differential amplifier 110, video mixing amplifier 140, video amplifier 170 and vertical sweep amplifier 200 of Fig. 1;

Fig. 4A is a diagram of a circuit connection alternative to that below the line x—x of Fig. 4;

Fig. 9A shows in vertical projection the relation of a bombing airplane to its target;

Fig. 9B illustrates the variation with time of the voltage from rate sweep generator 180, a voltage variation which corresponds to the variation in slant range from airplane to target; and Figs. 10A and 10B illustrate the patterns produced on oscilloscope screen 2 when switch S is closed upward and downward, respectively.

In all figures, like numerals and letters designate like elements.

It will be assumed that the airplane from which the observations are made is equipped with known means for measurement of altitude and air speed. Further, for simplicity, it will be assumed that the airplane flies without leeway, at constant ground speed to be determined, toward a target ahead.

Figure 1:
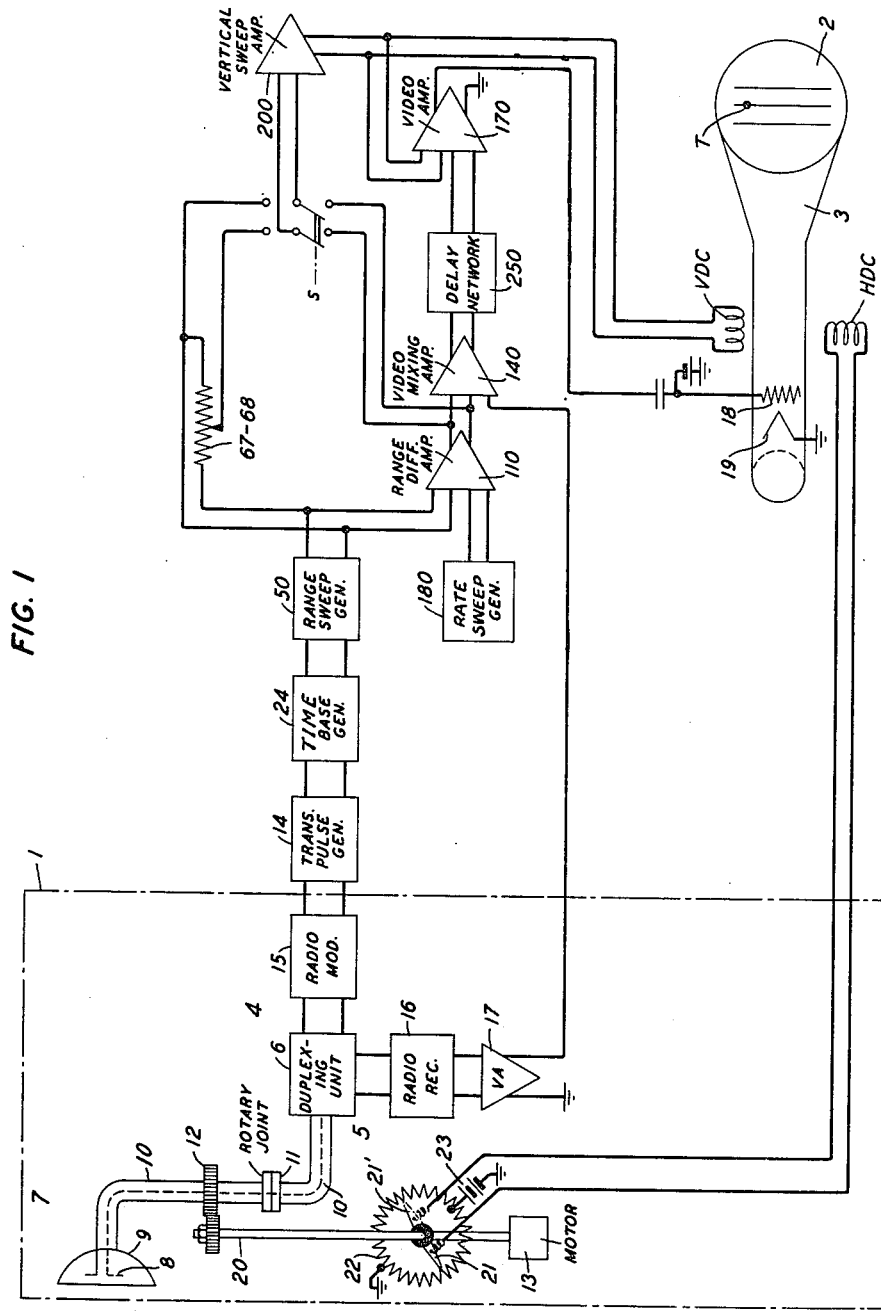

Referring now to Fig. 1, the radar system generally indicated by numeral 1, not itself a part of the present invention but here briefly described to facilitate understanding of the complete system, serves to detect the presence of a target ahead and represent that target by a luminous spot T on screen 2 of cathode ray oscilloscope 3. The location of spot T on screen 2 corresponds as later explained to the range and bearing, at a given instant, of the target represented.

System 1 includes a pulse transmitting circuit 4 and a pulse receiving circuit 5 connected through duplexing unit 6 to a common antenna 7 which is preferably of the highly directive type consisting of a small polarized dipole 8 at the focus of a parabolic reflector 9. Antenna 7 is connected by a coaxial link 10 through duplexing unit 6 to the circuits 4 and 5, with a rotary joint 11 in link 10. The portion of link 10 above joint 11 is provided with gearing 12 through which motor 13 is enabled to rotate antenna 7 at a constant speed in the horizontal plane. Rotation of antenna 7 in a vertical plane may be accomplished by a like arrangement of motor and gearing which is omitted here as unnecessary to the present description. The pulse generator 14 supplies a positive square top pulse of very short duration to control radio modulator 15 to supply at a convenient repetition rate extremely short and intense pulses of radio frequency energy to antenna 7 by which these pulses are directively radiated into space. Duplexing unit 6, which may be an automatic transmitter-receiver switch of any known type, effectively short-circuits the input to receiving circuit 5 while antenna 7 is emitting but allows free passage to circuit 5 of the low level echo received by antenna 7 from a reflecting target. The interval between successive emissions by antenna 7 is made longer than enough to include the reception of radio echoes from the most distant target to be attacked.

A portion of the energy radiated by antenna 7 is intercepted and reflected, usually diffusely, by the target. A part of this reflected portion is received by antenna 7 and transformed into an electrical pulse which passes through duplexing unit 6 to radio receiver 16 in circuit 5 where it is amplified and detected. The detected pulse is further amplified by video amplifier 17 and is thus available to produce intensity modulation of the cathode ray beam of oscilloscope 3. Oscilloscope 3 may be of the well known magnetic deflection type and is not shown in detail in Fig. 1 beyond intensity grid 18, cathode 19, fluorescent screen 2 and deflecting coils HDC and VDC for horizontal and vertical beam deflection, respectively.

Shaft 20, through which motor 13 drives gear 12, carries a pair of potentiometer wipers 21 and 21' insulated from each other and from shaft 20 on which they are mounted radially opposite each other. Wipers 21 and 21' traverse potentiometer 22 fixed in the airplane. Battery 23 is connected across diametrically opposite points of potentiometer 22. The rotation with shaft 20 of wipers 21 and 21' selects a fraction of the voltage of battery 23 ranging from zero when the pointing of antenna 7 is directly ahead to a maximum when antenna 7 points abeam. The polarity of the selected voltage depends on the left or right pointing of antenna 7 and the voltage so selected is applied to produce a current in horizontal deflecting coil HDC of oscilloscope 3. Auxiliary means, not shown, are provided for horizontal centering of the cathode ray beam on screen 2 when wipers 21 and 21' select zero voltage.

When the echo pulse from the reflecting target is available on grid 18 to produce intensity modulation of the cathode ray beam a luminous spot T representing the target will appear on screen 2 located vertically thereon at a position corresponding to the target range provided a vertical sweep current, synchronized with the emission of energy from antenna 7, is caused to flow in vertical deflecting coil VDC. The horizontal sweep current in coil HDC insures that the target spot will appear displaced left or right on screen 2 according to the bearing of the target left or right. For the present purpose, it is assumed that the target is directly ahead.

It is convenient to describe functionally the operation of some of the major components of the system of Fig. 1, postponing the detailed description of the involved circuits.

Each trigger pulse from pulse generator 14 initiates the emission of a pulse of radio frequency energy from antenna 7 and at the same time is supplied to actuate time base generator 24. Generator 24 produces a pair of voltage pulses of opposite polarity and lasting for approximately 100 microseconds, which are both supplied to range sweep generator 50, the negative pulse serving to excite in generator 50 a positive sweep voltage rising through a voltage range of about 100 volts linearly with time at a predetermined rate throughout the 100-microsecond interval, the positive pulse producing a positive pedestal voltage on which is superposed the rising sweep voltage. This sweep voltage on a pedestal recurs with each radar emission and starts simultaneously therewith. It is supplied by range sweep generator 50 at all times to range differential amplifier 110 and when switch S is closed upwards it is fractionally supplied also to vertical sweep amplifier 200.

Rate sweep generator 180 produces a voltage slowly decreasing linearly with time from an adjustable initial value and at an adjustable rate of decrease. This voltage occupies from 100 to 400 seconds to decrease through a range of 100 volts, so that throughout any 100-microsecond interval it may be considered constant. The output of generator 180 is likewise applied to range differential amplifier 110. Obviously, the initial value of the decreasing output voltage of generator 180 may be chosen less than the maximum value reached by the rising voltage of generator 50 so that in each 100-microsecond interval there will be an instant of equality of the two voltages on the input of range differential amplifier 110. As the voltage from generator 180 decreases, this instant of equality will occur progressively nearer to the start of the 100-microsecond interval, that is to say, nearer to the moment of emission of an object ranging pulse from antenna 7.

To anticipate the later description, it may here be said that the voltage from generator 180 is so chosen that at a given time the instant of equality of the voltages from generators 50 and 180 occurs simultaneously with the reception by antenna 7 of an echo reflected from a chosen target and the rate of decrease of the voltage from generator 180 is so adjusted that this instant continues to occur simultaneously with the reflected echo as the range of the target decreases.

Before continuing the functional description of the system of Fig. 1, it is proper here to describe the circuits so far involved.

Referring now to Fig. 2 a short positive trigger pulse from pulse generator 14 is applied to grid 25 of tube $V_1$, which is suitably a 6SN7, after differentiation by the circuit comprising condenser 26 and resistance 27. Grid 25 of tube $V_1$ is negatively biased by battery 28 so that tube $V_1$ is normally not conducting. Differentiating circuit C26R27 produces a positive pip at the leading edge of the trigger pulse, an instant hereinafter designated as $t_0$. A negative pip at the trailing edge of the trigger pulse is disregarded. Prior to the arrival of the positive pip on grid 25 no anode current flows in tube $V_1$ and there is no voltage drop across the resistor 29 through which anode 30 of $V_1$ is connected to 300-volt battery 31. Battery 31 is also connected through resistor 32 to anode 33 of tube $V_2$, a double triode such as a 6N7, through resistor 34 to grid 35 and through resistor 29 to anode 36 of $V_2$. Cathodes 38 and 39 are electrically connected together and through resistors 40 and 41 in series to ground. The junction of resistors 40 and 41 is connected to grid 42 through resistor 43 while grid 42 is shunted to ground by condenser 44. Cathode 45 of $V_1$ is likewise grounded. In all circuits cathode heating power is understood to be supplied though not shown. Between ground and cathode 39 of $V_2$ are connected condenser 46 and resistance 47 in series, from the junction of which, through condenser 48 shunted by resistor 49, a square topped voltage pulse negative to ground of 100 microseconds duration is fed to range sweep generator 50. Also to generator 50 a square topped voltage pulse, positive to ground, is fed from anode 33 of $V_2$. Of these voltage pulses, the former excites the rising sweep voltage produced by generator 50 while the latter provides the pedestal which the sweep voltage overlies.

In the circuit of Fig. 2, grid 25 of $V_1$ is normally biased to cut-off by battery 28. Grid 42 of tube $V_2$ is biased to cut-off by the voltage developed across resistors 40 and 41 in series by the flow of current in the right half of $V_2$ from anode 33 to cathode 38. Since grid 35 is connected through 1.5-megohm resistor 34 to battery 31, its voltage is slightly higher than that of cathode 38, namely, about 20 volts positive to ground and the right half of $V_2$ is normally conducting. Condenser 37 is connected between grid 35 and anode 36.

A positive voltage pip drives grid 25 positive, so that $V_1$ becomes conducting and its anode voltage falls. Anode 36 of $V_2$ is connected directly to anode 30 of $V_1$ and through condenser 37 to grid 35 of $V_2$. The fall of voltage at anode 30 thus is coupled through condenser 37 to grid 35 to cut-off the right half of $V_2$, and the consequent disappearance of current from resistors 40 and 41 permits the left half of $V_2$ to become conducting.

Initially, $V_1$ is not conducting, anodes 30 of $V_1$ and 36 of $V_2$ are 300 volts positive to ground. In $V_2$ cathodes 38 and 39 as well as grid 35 are 20 volts positive while anode 33 is about 267 volts positive to ground, the right half of $V_2$ being conducting while the left of that tube is blocked. Grid 42 of $V_2$ is thus 20 volts negative with respect to cathode 39 and condenser 37 is thus across a potential difference of 280 volts between anode 36 and grid 35. The positive voltage pip from differentiating circuit C26R27 makes $V_1$ conducting and the potential at anodes 30 and 36 falls to about 165 volts. This drop of 135 volts at anode 36 is communicated through condenser 37 to grid 35 which accordingly falls to 115 volts negative to ground cutting off the right half of $V_2$ so that the potential of anode 33 rises to 300 volts. The current in resistors 40 and 41 becomes momentarily zero, thus removing the 20-volt negative bias on grid 42 so that the left half of $V_2$ becomes conducting, its anode 36 remaining 165 volts positive to ground. A small current now flows in cathode resistors 40 and 41 and condenser 37 starts to readjust its charge to the new voltage difference about 146 volts, between anode 36 and grid 35. This involves a rise in potential of grid 35 which on reaching the cut-off potential —10 volts allows the right half of $V_2$ to conduct. Now the flow of current in resistors 40 and 41 results in cut-off of the left half of $V_2$ and the initial conditions are restored. The readjustment of the charge of condenser 37 is by a partial discharge through resistor 34 and the left half of $V_2$. The time constant C37R34 is 300 microseconds and the rise in potential at grid 35 of $V_2$ from —115 volts to —10 volts requires 100 microseconds. During this interval the potential of anode 33 is 300 volts rising abruptly from 267 volts at the instant $V_1$ becomes conducting and falling rapidly 100 microseconds later. This furnishes a 33-volt positive square topped pulse. At the end of the 100-microsecond interval the potential of anode 33 falls slightly below the initial value of 267 volts because of a small flow of current from grid 35 to cathode 38. The 33-volt positive pulse is used as pedestal voltage in range sweep generator 50 and the terminal distortion is unimportant. Condenser 44 of capacitance .006 microfarad holds grid 42 at constant voltage with respect to ground. Simultaneously with the positive pulse at anode 33, there is produced a negative pulse, also square topped, across resistors 40 and 41 due to the abrupt drop and succeeding rise of current therein, a negative pulse which is taken off between cathode 39 and ground and is used as above stated to produce the sweep voltage in generator 50. Here the terminal distortion is harmful and is removed by the filter circuit comprising condenser 46, resistor 47 and condenser 48 shunted by resistor 49.

The input terminals of the circuit of Fig. 2 are A and ground G, across which the trigger pulse from generator 14 is applied. The output terminals are $B_1$, $C_1$ and ground $G_1$, the sweep producing pulse being taken between $C_1$ and ground, the pedestal pulse between $B_1$ and ground. Time base generator 24, which the circuit of Fig. 2 constitutes, defines the duration of the voltage rise in range sweep generator 50 and thus the range of the most distant target to be considered. The 100-microsecond interval, corresponding to a target distance of about 10 miles, is fixed by the choice of condenser 37 and resistor 34, in the case described 200 micromicrofarads and 1.5 megohms, respectively. The sweep interval is in any case preferably somewhat shorter than the interval between successive signals from antenna 7 which in some radar installations may be long enough for a 100-mile range to be dealt with.

In Fig. 3 is shown the circuit of range sweep generator 50. Input terminals for generator 50 are $B_2$ and $C_2$ on which are impressed positive and negative pulses from terminals $B_1$ and $C_1$ respectively, of Fig. 2, and ground G. The negative square topped voltage pulse at terminal $C_1$, of Fig. 2 is applied at terminal $C_2$ of Fig. 3 to grid 51 of tube $V_3$, a 6AC7, for example, initially conducting and rendered inactive when a negative pulse arrives at grid 51. Screen grid 52 of $V_3$ is supplied through resistor 55 from battery 31' which may be the same as battery 31 serving to supply all voltages of the system of Fig. 1. Grid 52 is shunted to ground by condenser 56 while suppressor grid 53 and cathode 54 are grounded. Anode 57 is supplied through resistor 58 and bias control tube $V_5$, a diode such as one-half of a 6H6, from the junction of resistors 59 and 60, these resistors constitute a voltage divider between battery 31 and ground whereby anode 61 of $V_5$ is supplied with 50 volts. Cathode 62 of $V_5$ is connected through resistor 58 to anode 57 of $V_3$. Condenser 63 shunting resistor 58 is connected between anode 57 of $V_3$ and grid 64 of tube $V_4$ which is suitably one-half of a 6SN7GT. Anode 65 of $V_4$ is supplied directly from battery 31 while between cathode 66 and ground are connected resistors 67 and 68 in series.

Resistor R, preferably 200,000 ohms, is connected between cathode 66 and the junction of condenser 63 with anode 57. Between anode 57 and input terminal $B_2$ are connected condenser C about 200 micromicrofarads, and condenser C', which may be 1,000 micromicrofarads, in series. Shunting this connection of condensers C and C' are condensers 69 and 70 in series serving as a trimming capacitance. Condenser 69 is suitably an air condenser, while condenser 70 may have a capacitance of 1,000 micromicrofarads. Resistor R', about 330,000 ohms, is inserted between cathode 66 and the junction of condensers C and C'.

It will be observed that the positive pedestal voltage pulses from time base generator 24 applied to input terminal $B_2$ are interposed between ground and the circuit of Fig. 3 to the right of tube $V_3$. Further, those acquainted with sweep voltage generators, well described, for example, in "Time Bases" by O. S. Puckle, published in London in 1943, will recognize that the circuit of Fig. 3 is such a generator, inactive while tube $V_3$ is conducting but generating a rapidly rising voltage starting from the instant when $V_3$ is blocked by the negative pulse applied to grid 51 from generator 24. This rapidly rising voltage rises substantially linearly with time and continues so to rise until the negative pulse from generator 24 has passed from grid 51. The rate of voltage rise, controlled by the ratio of the voltage across condenser 63 to the product RC, is in the present circuit about 1 volt per microsecond. This sweep voltage appears as a voltage positive to ground at cathode 66 of tube $V_4$ to which output terminal $D_1$ is connected. Tube $V_4$ is a cathode follower tube supplying negative feedback from cathode 66 through resistor R and condenser 63 to grid 64 to linearize this voltage wave as a function of time while the circuit R'C' is an integrating circuit further contributing to the desired linearity.

The output voltage from the circuit of Fig. 3 is taken between terminal $D_1$ and ground, or a desired fraction of it may be taken between terminal $E_1$ and ground. Terminal $D_1$ is used when switch S, Fig. 1, is closed downward, terminal $E_1$ when S is closed upward.

Resistors 55, 59, and 60 are respectively about 68,000, 20,000, and 100,000 ohms while resistor 58 is 2.2 megohms. Resistors 67 and 68 are about 250,000 and 50,000 ohms, respectively, so that the pedestal and sweep voltages at terminal $E_1$ are each about one-sixth those at terminal $D_1$.

It will be clear from the foregoing description that in the circuit of Fig. 2 tube $V_2$ is a single-shot multivibrator synchronized by tube $V_1$ with the trigger pulse which simultaneously actuates radar system 1. The output negative pulse from terminal $C_1$ controls the conductance of tube $V_3$ in the circuit of Fig. 3, and the duration of the voltage rise at terminals $D_1$ and $E_1$ of Fig. 3. This voltage rise is linearized by negative feedback from tube $V_4$ and further improved in linearity by the integrating circuit R'C', for which values of resistance and capacity are chosen with regard to the values of R and C and the amplification factor of tube $V_4$. Diode $V_5$ is so inserted that in the intervals between successive sweeps condenser 63, of .006-microfarad capacitance, may be rapidly charged by diode $V_5$ through tube $V_3$, which is during such intervals conducting, and so be at a fixed potential at the start of each successive pulse from tube $V_2$. The circuit of Fig. 3 is not itself a part of the present invention but is disclosed and claimed in the copending application of J. W. Rieke, filed March 21, 1944, Serial No. 527,457, issued on November 2, 1948 or Patent 2,452,683 and assigned to the same assignee as the present application.

The linearization above attributed to the circuit of tube $V_4$ is briefly explained as follows:

With the circuit constants enumerated in the description of the circuit of Fig. 3, tube $V_3$ being initially conducting while tube $V_4$ is permanently so, cathode 66 and the junction of resistor R with condenser C are positive to ground, about 62 volts and about 2 volts, respectively, the latter voltage being the voltage drop across tube $V_3$. The voltage drop across condenser 63 adds to that at the junction of R and C to make grid 64 about 50 volts positive to ground and so 12 volts negative to cathode 66.

When a negative pulse at terminal $C_2$ blocks tube $V_3$, charging current flows from battery 31, through tube $V_4$, resistor R and condenser C, to ground through the circuit of Fig. 2. Trimming condenser 69 is to be considered added to condenser C, condensers 70 and C' being of large enough capacitance to be disregarded. Condenser 70 is a blocking condenser while condenser C' is part of an integrating circuit presently to be described. The sweep voltage at terminal $D_1$ is that across resistor R and condenser C in series and will rise linearly with time if the charging current is constant.

The value of the charging current is fixed by the voltage of battery 31, the conductance of tube $V_4$ and the values of R and of C. It is to be understood that a regulated voltage is furnished by battery 31 so that the charging current will be constant if tube $V_4$ is of unvaried conductance. It will be recognized that tube $V_4$ is a cathode follower: cathode 66 follows in voltage grid 64. The voltage at the junction of resistor R and condenser C appears at grid 64. Increase in the charging current increases the voltage drop across resistor R and so lowers the voltage at grid 64, reducing the conductance of tube $V_4$. The opposite effect is produced by a decrease in charging current. Tube $V_4$ is thus a constant current tube, made so by negative feedback through resistor R from cathode 66 to grid 64.

The voltage at terminal $D_1$ (and a fraction of this at terminal $E_1$) rises linearly with time except near the end of the sweep interval when the rate of rise is slightly reduced. The circuit R'C' introduces in series with condenser C a correcting voltage, namely, that across condenser C', which is zero while the rate of voltage rise across condenser C is constant but rises progressively as this rate decreases. By suitable choice of R' and C' the voltage at terminal $D_1$ is thus enabled to rise at a constant rate throughout the sweep interval.

The voltage at terminal $D_1$ varies from about 100 to about 200 volts, starting with about 65 volts during the interval between sweeps, to which a 33-volt pedestal is added at the start of the sweep.

Before describing in detail rate sweep generator 180, shown in Fig. 4, it is well to point out that the instantaneous slant range from airplane to target, being the hypotenuse of a right triangle of which one leg is the airplane's altitude and the other leg is the horizontal distance from a point directly under the airplane to the target, decreases with time at first rapidly and then more slowly, ultimately reaching a minimum value when the airplane is directly over the target. If the altitude is a large fraction of the horizontal distance at which observations are begun, the airplane flying at this altitude with constant speed, the slant range initially decreases substantially linearly with time but soon the rate of decrease is perceptibly reduced. The altitude leg is constant, while the horizontal leg diminishes linearly with time.

As will be later explained, it is desired to create on screen 2 a horizontal line maintained in coincidence with the echo spot representing the target. This is accomplished by producing a voltage decreasing with time and equaling the rising voltage from range sweep generator 50 at successively earlier instants in successive 100-microsecond time base intervals of which the starting instants are repetitively synchronized with the pulses emitted from antenna 7. As later explained, the instant of equality of these voltages is marked by the appearance on intensity grid 18 of a momentary brightening voltage which gives rise to the desired horizontal line. The initial magnitude and the rate of decrease of the decreasing voltage are to be chosen so that the line referred to shall coincide and continue to coincide with the target echo spot on screen 2. Then both the horizontal line and the echo spot indicate by their vertical location on the screen the slant range from airplane to target, and the rate of decrease of the voltage compared with the range sweep voltage is a measure of the slant range speed of the airplane.

If A is the altitude, Ho the initial horizontal distance, V the velocity of the plane and $t$ the time elapsed since the horizontal distance was Ho, then the horizontal leg of the triangle in Fig. 9A is $$H = Ho - vt$$

and the slant range $SR = \sqrt{A^2 + H^2}$.

SR is therefore the vector sum of A and H, which may be represented by alternating voltages in quadrature with each other and these voltages may be vectorially summed to an alternating voltage representing SR. The alternating sum voltage, rectified, becomes a unidirectional voltage representing at any moment the slant range from plane to target, if the voltage representing H is made to decrease at the proper rate.

Fig. 4 exhibits the circuit of rate sweep generator 180 of Fig. 1. Generator 180 includes rate sweep generator 80 of Fig. 1 of my Patent 2,406,358 referred to above and is identical with the corresponding element disclosed and claimed therein. In Fig. 4, oscillator 71, which may be of any known design, generates an alternating voltage of a convenient frequency, say 5,000 cycles per second. Its output circuit comprises potentiometer 72 and condenser 73 in series, their junction being grounded. The resistance of potentiometer 72 and the capacitance of condenser 73 may, but need not be, so chosen that the alternating voltages across these elements are numerically equal. These voltages are in quadrature with each other, and if one, say that across potentiometer 72, is fractionated by tap 74 to derive a voltage proportional to the altitude of the plane, the other, across the condenser 73, may be caused to decrease linearly with time and may be fractionated proportionally to the horizontal range. These voltages may be vectorially summed to produce a voltage proportional to slant range, using for this purpose such a vector combiner as is described in United States Patent 1,684,403, granted September 18, 1928, to W. P. Mason.

Potentiometer 72 is suitably calibrated in terms of altitude so that the alternating voltage across it is representative of the maximum altitude at which flight is contemplated. By tap 74 a fraction of this voltage is selected corresponding to the actual altitude in the particular case. A voltage equal or in known ratio to that across potentiometer 72 appears across condenser 73 and is amplitude modulated by any known modulating circuit, generally designated by numeral 75, in accordance with with the magnitude of the horizontal distance voltage from rate sweep generator 80, presently to be described. Potentiometer 76 may be bridged across the output circuit of modulator 75 and provided with tap 77 whereby allowance may be made for the net amplification occurring in modulator 75. If the voltage across potentiometer 72 is $V \sin wt$, that across condenser 73 is $V \cos wt$. The first is fractionated by tap 74 to furnish a voltage $VA \sin wt$, where A is the plane's altitude. The second is modulated by modulator 75 to become equal to $VH \cos wt$, where H represents the horizontal plane to target distance on the same scale as A represents the altitude. The voltage $VA \sin wt$ between tap 74 and ground and the quadrature voltage $VH \cos wt$ between tap 77 and ground are vectorially summed in vector combiner 78, and their vector sum is rectified by rectifier 79, of any suitable known form, to provide a unidirectional voltage representing the slant range. This is the voltage which is to be so adjusted in initial magnitude and rate of decrease as to equal at all times the rising sweep voltage from range sweep generator 50 at the instant in each time base interval corresponding to the reception of a target echo. Obviously, either of the quadrature voltages may be chosen to represent altitude, the other being modulated by modulator 75.

The voltage $VA \sin wt$ does not change in amplitude, while the voltage $VH \cos wt$ decreases linearly with time since H is caused so to decrease. Modulator 75 may conveniently employ a 6L7 tube, which is provided with two control grids on one of which is impressed the voltage of condenser 73 and to the other of which is applied the output voltage from rate sweep generator 180.

Rate sweep generator 180, of which the circuit is shown in Fig. 4, provides a voltage slowly decreasing between terminal F and ground from about 200 to about 100 volts over a time interval varying from 1½ to 6 minutes. The circuit of Fig. 4 includes vacuum tubes $V_6$, $V_7$, and $V_8$ and voltage regulator tube $V_9$. Suitably tubes $V_6$ and $V_7$ are respectively the two triodes contained in a 6SL7, $V_8$ is one-half of a 6SN7GT, while $V_9$ is a VR75. Battery 31 supplies the voltage required in the circuit of Fig. 4. Across this battery is connected potentiometer 81 of about 10,000 ohms resistance, on which tap 82 selects a fractional voltage adjusted, as later described, to be proportional to the speed of the airplane relative to the target. This fractional voltage appears across resistor 83, about ½ megohm, and from a fixed point 84 thereon about 1/10 of the voltage selected by tap 82 is applied through 3-megohm resistor 85 to grid 86 of tube $V_6$. Cathode 87 is connected through resistor 88 to battery 31 and to ground through the 300 ohms of resistors 89 and 90 in series. Variable resistor 89 is so adjusted that when tap 82 is at ground no current flows in resistor 85.

Anode 91 of $V_6$ is directly connected to cathode 92 of $V_7$ of which grid 93 is positively biased from the junction of resistors 94 and 95 to a potential of about 45 volts. Anode 96 of $V_7$ is supplied from battery 31 through 10-megohm resistor 97. Sweep condenser $C''$, 4 microfarads, together with resistor 85 constitutes the sweep circuit controlled by the voltage taken between point 84 and ground. Effectively condenser $C''$ is connected between grid 86 of $V_6$ and anode 96 of $V_7$, which tubes constitute a direct coupled direct current amplifier supplying negative feedback to linearize with time the variation in voltage across condenser $C''$. Actually, instead of being directly joined to anode 96, condenser $C''$ is connected to cathode 93 of tube $V_8$, of which grid 99 is joined through resistor 100 to anode 96 of $V_7$. Anode 102 of $V_8$ is directly supplied from battery 31, the load resistor of $V_8$ being composed of voltage regulator tube $V_9$ in series with resistor 103. Across tube $V_9$ is shunted resistor 104 which may be of 100,000 ohms resistance and is tapped to furnish at terminal F a desired fraction of the constant voltage across tube $V_9$, plus the decreasing voltage across resistor 103. Battery 105 provides a negative voltage to stabilize tube $V_9$. Grid 99 of $V_8$ is shunted to ground by condenser 106, which with resistor 100 serves to prevent oscillations of voltage at grid 99. Tube $V_8$ functions as a cathode follower tube so that condenser $C''$ when connected between cathode 98 of $V_8$ and grid 86 of $V_6$ is effectively connected between that grid and anode 96 of $V_7$. To increase the amplification positive feedback is provided by resistor 107 between cathode 98 of $V_8$ and cathode 87 of $V_6$, thereby raising the amplification of the amplifier circuit to 5,000.

Switch S' is closed as shown in Fig. 4, when switch S of Fig. 1 is closed upward. Closing switch S' connects battery 31 through 5,000-ohm resistor 108 to one plate of condenser $C''$, the other plate thereof being connected to grid 86, which is at ground potential and only about 2 volts negative to cathode 87. Condenser $C''$ accordingly charges to about 195 volts (battery 105 opposing battery 31) positive to ground at cathode 98, through resistor 108 and the grid-cathode circuit of $V_6$. This voltage also appears across tube $V_9$ in series with resistor 103, 75 volts being across tube $V_9$. Thus, tap 109 on resistor 104 makes available at terminal F 120 volts plus a desired fraction of 75 volts. This is a steady state voltage independent of the operation of the sweep circuit of Fig. 3. The steady state continuous voltage so obtained is, through modulator 75, employed to modulate the amplitude of the alternating voltage across condenser 73 proportionally to the horizontal distance represented by the setting of tap 109. The alternating voltage thereby obtained is vectorially summed in vector combiner 78 with the alternating voltage selected by tap 74 and representing the plane's altitude. The vector sum, rectified in rectifier 79, becomes a unidirectional voltage proportional to the slant range from the plane to a target horizontally ahead of the plane by a distance corresponding to the setting of tap 109, by the adjustment of which the rectified sum voltage can be made to equal the sweep voltage from range sweep generator 50 at any desired instant in the 100-microsecond interval from near its end to near its beginning.

In the description so far given, the frequency of oscillator 71 has been assumed constant. Should it vary, the voltage across condenser 73 will correspondingly change. To avoid errors thereby introduced in the vector sum voltage supplied to the range differential amplifier, the circuit shown below the line $x'$—$x'$ in Fig. 4A may replace the corresponding portion below the line $x$—$x$ shown in Fig. 4 between terminal F and vector combiner 78, connections $a$, $b$ and $c$ corresponding respectively to connections $a'$, $b'$ and $c'$. In the circuit of Fig. 4A, the alternating output voltage of modulator 75, directly fed through tap 77 to one input terminal of vector combiner 78 from the primary winding of transformer 117 is also rectified in the secondary circuit of that transformer comprising rectifier tube 119, suitably a 6H6, in series with resistor 121 shunted by smoothing condenser 122. The output of rate sweep generator 180, Fig. 4, at terminal F, is connected to the junction of resistor 121 and the secondary winding of transformer 117, while the junction of resistor 121 and anode 120 of tube 119 is connected to the input of direct current amplifier 123, the output of which takes the place of the direct connection shown in Fig. 4 from terminal F to modulator 75. Thus, the rectified output voltage of modulator 75, nominally equal to the voltage from terminal F, is compared with the latter voltage and the difference of these voltages, if any, is amplified by amplifier 123 and applied to modulator 75 in such polarity as to reduce the difference.

By this arrangement, the voltage at the junction of resistor 121 and the secondary of transformer 117 is maintained continuously equal to the voltage at terminal F and the alternating voltage supplied by tap 77 to vector combiner 78 continuously represents in amplitude the slowly decreasing rate sweep voltage, independently of the frequency of oscillator 71.

It is obvious that if tap 109 is so set that the instant of equality of voltages just mentioned occurs at the instant of return of a target echo, the horizontal range of the target at that instant may be read as represented by the voltage between terminal F and ground. Resistor 104 is a potentiometer provided with a scale calibrated in distance units suitably for this purpose, increasing upward from the junction of potentiometer 104 and resistance 103. Further, if the voltage at terminal F is caused to decrease at the proper rate, the equality of voltages can be made to occur earlier and earlier in successive time base intervals, coinciding continuously with the progressively earlier return of the target echo, so that the rate of decrease of the voltage at terminal F is a measure of the plane's horizontal speed.

When switch S' is opened, condenser C" starts to discharge through 3-megohm resistor 85, the discharge rate being controlled by the voltage at tap 84. From the stated values of capacity of condenser C" and of resistance of resistor 85, the time constant C"R85 appears to be 12 seconds, but the effective time constant determining the linearity of the sweep is the product of this 12 seconds by the amplification factor obtained from tubes V6, V7 and V8, namely 1,000 minutes. In the circuit of Fig. 4 enough amplification is provided to make unnecessary an integrating circuit such as R'C' of Fig. 3. By analysis of the operation of Fig. 4 when switch S' is opened, it may be shown that as condenser C" discharges, grid 86 of V6 remains substantially at ground potential, so that the discharge current through resistor 85 is determined by the voltage at tap 84. The operation is in effect a cancellation of the charge placed on condenser C" when S' is closed, by an opposing sweep charge whereby the voltage across C" is caused to fall at a rate equal to E'/R85 C" volts per second where E' is the voltage to ground at tap 84. When E' is 12 volts the voltage at cathode 98 and so at terminal F will fall 1 volt per second, the voltage drop across V9 is constant. Therefore, if initially with S' closed, tap 109 is at cathode 98 and E'=12 volts, the instant of equality of the voltages from terminal F and from terminal D1 of Fig. 3 will move when S' is opened in 100 seconds near the end to near the beginning of the 100-microsecond interval prescribed by time base generator 24.

As stated above, the voltage at tap 84 is determined by the setting of tap 82 on potentiometer 81. When tap 82 is at the junction of the positive terminal of battery 31 and potentiometer 81, the rate of decrease of the voltage across condenser C" is least and the instant of equality of input voltages to range differential amplifier 110 is latest in the time base interval. If this setting of tap 82 maintains simultaneous the instant of this voltage equality and the instant of echo return from the target, the total resistance of potentiometer 81 corresponds to the minimum measurable horizontal plane speed. In higher speeds, the rate of decrease of voltage across condenser C" is appropriately increased by moving tap 82 nearer to ground, wherefore potentiometer 81 is calibrated in speed units, the scale reading increasing downward from this junction of potentiometer 81 and battery 31.

The rate sweep circuit of Fig. 4 is also not a part of the present invention but is described and claimed in the copending application of J. W. Rieke above referred to.

Figures 5, 6:
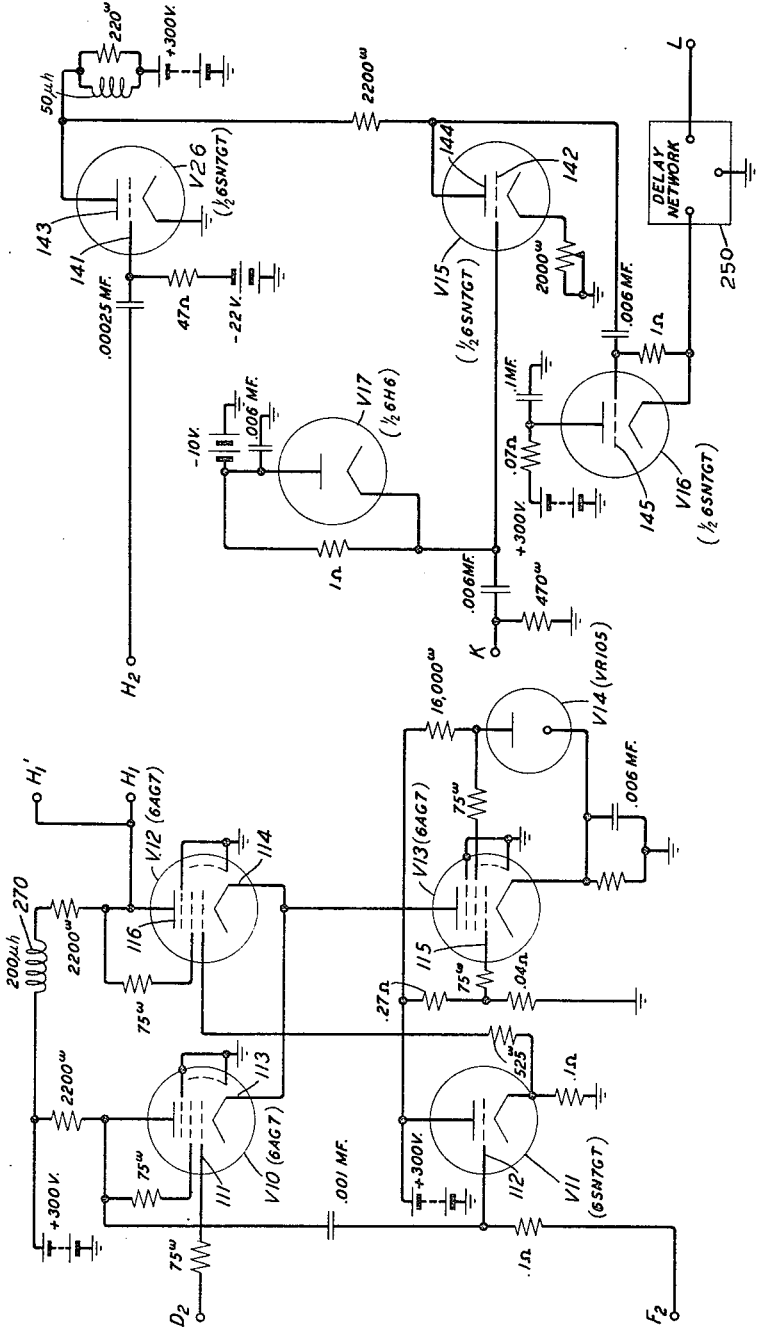

In the system of Fig. 1, the major components following range sweep generator 50 and the rate sweep generator 180 use known circuit arrangements and will be here described chiefly functionally, reference being made to the attached drawings for the circuit details. Referring to Fig. 5, vacuum tubes $V_{10}$ and $V_{11}$ of range differential amplifier 110 receive on grids 111 and 112, respectively, the voltages appearing at points $D_1$ of Fig. 3 and $F_1$ of Fig. 4. Of these voltages, the first is a rising sweep voltage lasting 100 microseconds, the second is a voltage slowly decreasing over a comparatively long time equaled by the rising voltage at an instant in the 100-microsecond interval depending on the positions of taps 82 and 109 of Fig. 4. Tube $V_{12}$ is an amplifying tube providing positive feedback to tube $V_{10}$ through constant current tube $V_{13}$ which is inserted between ground and joined cathodes 113 and 114 of tubes $V_{10}$ and $V_{12}$, respectively. The cathode current of tubes $V_{10}$ and $V_{12}$ is controlled by the potential of grid 115 of $V_{13}$. Tube $V_{11}$ is a buffer tube protecting rate sweep generator 180 from loading due to grid current in tube $V_{12}$, while voltage regulator tube $V_{14}$ controls the screen voltage of $V_{13}$.

It may be shown by analysis of the operation of the circuit of Fig. 5 that when the voltages at terminals $D_2$ and $F_2$ are equal there appears a square-topped positive pulse at anode 116 and $V_{12}$ which continues to the end of the 100-microsecond interval. This pulse is supplied from terminal $H_1$ to video mixing amplifier 140 and from terminal $H_1'$ when switch S is closed downward to vertical sweep amplifier 200.

Video mixing amplifier 140, of Fig. 6, comprises pulse amplifying tube $V_{26}$, on grid 141 of which is impressed the pulse from terminal $H_1$ of Fig. 5, and video amplifier tube $V_{15}$ of which grid 142 receives at terminal K the echo signal from video amplifier 17 of Fig. 1. The bias of grid 142 is controlled by tube $V_{17}$. The amplified positive pulse at anode 143 of $V_{26}$ and the amplified echo signal at anode 144 of $V_{15}$ are applied on grid 145 of tube $V_{16}$, from the cathode circuit of which are fed a pair of negative voltage pips corresponding respectively to the arrival of the echo signal at terminal K and the start of the square-topped pulse applied to terminal $H_2$. For a reason later given these voltage pips are delayed 5 microseconds by network 250. Ground terminals, not shown, are provided for the circuits of Figs. 5 and 6 and subsequent figures.

Figure 7:
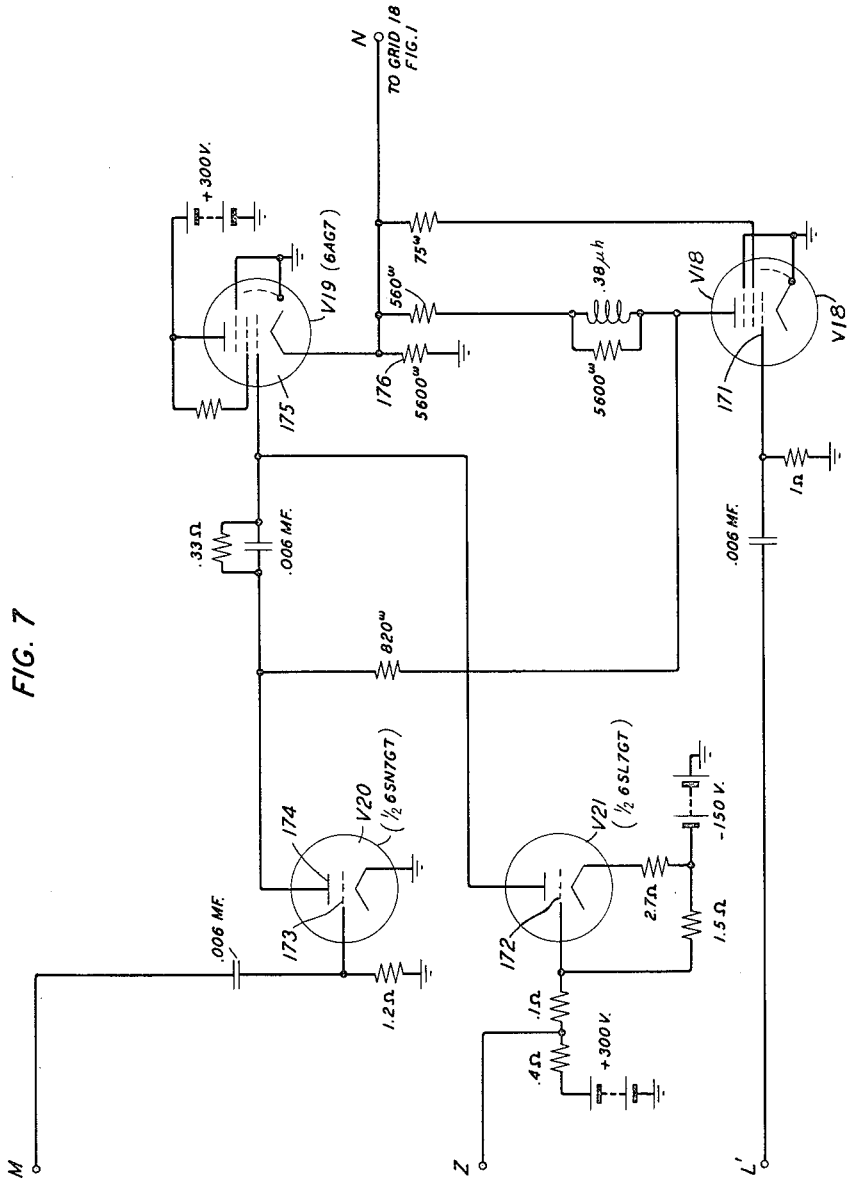

In Fig. 7 is shown the circuit of final video amplifier 170. Terminal L' receives from terminal L of Fig. 6 the negative voltage pips, delayed 5 microseconds by network 250, and applies these to grid 171 of tube $V_{18}$ in amplifier 170. The amplification and reversal of sign of these voltage pulses is accomplished by tubes $V_{18}$ and $V_{19}$ so that corresponding positive voltage pips are available at terminal N. To permit these voltages to produce traces on screen 2 of oscilloscope 3 of Fig. 1, the positive pips are superimposed on a positive pedestal voltage derived from tube $V_{20}$ to grid 173 of which are applied via terminal N unblanking pulses that are explained in the description of Fig. 8. It is convenient to provide also at terminal Z a blanking voltage, derived in any convenient manner from radar system 1 to blank the oscilloscope trace during the rearward pointing of antenna 7. This blanking voltage may be a positive voltage applied to grid 172 of tube $V_{21}$ during such rearward pointing and replaced by a ground when antenna 7 points forward of the airplane. When present the blanking voltage annuls the output voltage at terminal N. Thus, only when antenna 7 points forward is the negative bias of grid 18, Fig. 1, to be overcome and the trace is brightened only when a positive voltage pip appears at terminal N together with a pedestal voltage from tube $V_{20}$.

In Fig. 8, the circuit of vertical sweep amplifier 200 comprises tubes $V_{22}$, $V_{23}$, $V_{24}$ and $V_{25}$. Tubes $V_{22}$ and $V_{23}$ are suitably the two triodes of a 6SN7GT. Their respective anodes 201 and 202 are supplied from battery 31 through resistor 203. Grids 204 and 205 are biased 50 volts negative by battery 206 through resistors 207 and 208 for grid 204, 209 and 210 for grid 205 and further biased by the voltage drop in common cathode resistor 211. When switch S, Fig. 1, is closed upward the fraction of the output sweep voltage of range sweep generator 50 appearing at terminal $E_1$ of Fig. 3 is applied via terminal I through condenser 212 to grid 204. At the same time switch S″ ganged with switch S, is closed upward and grounds the junction of resistors 207 and 208 thereby removing from grid 204 the bias of battery 206. As a result, tube $V_{22}$ becomes conducting, increasingly so as the sweep voltage rises at terminal I. A correspondingly increasing current flows in resistor 211. At the same time, a negative voltage wave appears at anode 201 which is transferred from terminal M′ to terminal M of Fig. 7. The bias on grids 204 and 205 suffices to cut off the pedestal of the voltage from the range sweep generator and only a rising voltage appears across resistor 211 to be transferred through stopping condenser 213 and resistor 214 to the junction of resistors 216 and 217 of which the other terminals are connected respectively to grids 218 and 219 of tubes $V_{24}$ and $V_{25}$, these grids being normally biased to cut off through resistor 220 by battery 221. Tubes $V_{24}$ and $V_{25}$ are amplifying tubes in parallel and at their anodes 222 and 223 there appears the amplified sweep voltage which produces a vertical ray deflecting current in coil VDC of oscilloscope 3. A permanent magnet, not shown, is used to fix the starting point of the vertical sweep, preferably near the bottom of screen 2.

Referring again to video amplifier 170 of Fig. 7, the negative voltage wave arriving at terminal M is reversed in sign in tube $V_{20}$ and ultimately appears as an unblanking pulse across resistor 176 in the cathode circuit of tube $V_{19}$. This pulse is applied to intensity grid 18 of oscilloscope 3 which thus allows the trace on screen 2 to brighten when there arrives a negative pulse at terminal L′. Such a pulse, either a radar target echo or one occurring at the instant of equality of range sweep and rate sweep voltages produces a bright spot on screen 2.

Referring to Fig. 8, when switches S, S′ and S″ are thrown downward, tube $V_{23}$ is rendered conducting and the positive square-topped pulse produced by range differential amplifier 110 produces a voltage across cathode resistor 211 which now is a square-topped wave, positive to ground, beginning at the instant of equality of range and rate sweep voltages and lasting to the end of the 100-microseconds time base interval. The cut-off bias of grids 218 and 219 is reduced to zero. The voltage at anodes 222 and 223 abruptly drops at the start of this cathode voltage and rises thereafter exponentially. This exponential rise in anode voltage of tubes $V_{24}$ and $V_{25}$ results in a rise in anode current which flows in coil VDC, the inductance of which is so chosen that the duration of this current is about 11 microseconds.

It is thus clear that when switches S, S′ and S″ are closed upward a vertical sweep starts from the bottom of oscilloscope screen 2 and lasts 100 microseconds. During this sweep, a bright spot appears on screen 2 only when there arrives on grid 18 either a target echo from radar system 1 or a pulse from range differential amplifier 110 at the instant range and rate sweep voltages are equal. The azimuth sweep current through coil HDC is controlled from potentiometer 22 of radar system 1, so that a target echo brightens the oscilloscope trace at a point corresponding horizontally to the target bearing, vertically to the target range. On the other hand, the voltage equality pulse is independent of the rotation of antenna 7 and the corresponding trace brightness appears as a horizontal line.

Fig. 10A here represents the appearance of screen 2 under these conditions. T is a target spot horizontally centered while RL is a line formed by the fusion of spots representing equality of range and rate sweep voltages. The vertical position of spot T represents target range, decreasing as the plane flies onward. Range line RL is made to intersect spot T at an initial instant by proper setting of tap 109 of Fig. 4. Spot T appears lower and lower as time goes on. While tap 109 may be manually shifted to maintain coincidence of RL and T, it is convenient to throw downward switch S and switches S′ and S″ ganged with it. Now, as previously described, a vertical sweep 11 microseconds long starts only at the moment of equality of range and rate voltages and line RL appears in a fixed position on the screen. This position would be at the bottom were it not for delay network 250 which delays the echo pulse and the range line pulse each about 5 microseconds.

Fig. 10B shows the appearance of screen 3 when switches S, S′ and S″ are thrown downwards. Range line RL appears vertically centered and stationary on screen 3 since its creating voltage pip on grid 18, although simultaneous with the equality of voltages starting the sweep, is delayed a constant 5 microseconds relative to the moment of such equality. This moment is continually earlier because the voltage at tap 82 on potentiometer 81 determines the rate of decrease of the rate sweep voltage, which accordingly equals the rising range sweep voltage at a continually earlier epoch in the time base interval. If tap 82 is so set that this advance of the moment of equality is proportional to the rate of decrease of the range from plane to target, spot T will continue to be intersected by line RL.

It will be noted that delay network 250 serves the purpose of placing the intersecting range line and target spot on the screen in a position convenient for observation. Further, it will be realized that it is much simpler to adjust tap 82 to maintain the coincidence of spot T and line RL than it is by adjustment of tap 109 to follow the moving target spot of Fig. 10A.

The following recapitulation of the foregoing description will clearly set forth the method of the invention:

A series of short and uniformly spaced pulses of radio frequency energy are directively emitted from the radar antenna to strike a target which reflects a portion of the emitted pulses. This reflected portion for each pulse is received by the antenna at an interval after emission proportional to the distance of the target and gives rise to an echo spot on the oscilloscope screen. A horizontal sweep voltage controlled from the antenna drive shaft positions the echo spot horizontally on the screen in correspondence to the bearing of the target, while a vertical sweep voltage synchronized with the pulse emission positions the spot vertically in correspondence to the time interval between pulse emission and echo return, so to the target distance. The interval between successive radio pulses is made much longer than the time taken for the return of an echo from the most distant target it is desired to observe.

Also synchronized with each antenna pulse are the simultaneous definition of a time base interval, of length intermediate between the longest echo return time contemplated and the pulse interval, and the generation of a unidirectional voltage rising linearly with time and contemporaneous with the time base interval. Independently of these events, a voltage decreasing comparatively slowly with time is established and this decreasing voltage is compared in successive time base intervals with the rising voltage therein persistent. In each time base interval, the instant of equality of the compared voltages is marked by the appearance of a brightening pulse on the control grid of the oscilloscope which is manifested as a horizontal line on the screen. This line is by the vertical sweep voltage made to appear on the screen in vertical position corresponding to the interval between the instant of pulse emission and that of equality of the compared voltages. By adjustment of an initial value of the decreasing voltage and by control of its rate of decrease, the horizontal line referred to is made initially to intersect and to remain intersecting the target echo. As the target range decreases, the echo returns progressively earlier in each time base interval, while as the independent voltage decreases the instant of equality of the compared voltages likewise occurs progressively earlier in the same interval, and if this instant continuously coincides with that of echo return, the decreasing voltage is continuously proportional to the target range.

The independent decreasing voltage is unidirectional, being the rectified vector sum of two alternating voltages in quadrature of which the amplitudes are proportional, respectively, to the constant known altitude of the plane and to the decreasing horizontal distance from plane to target. The rectified vector sum of the quadrature voltages is proportional to the hypotenuse of a triangle of which one leg is plane altitude while the other leg is a horizontal distance. When, as by the adjustments mentioned in the preceding paragraph, the hypotenuse voltage is made continuously proportional to target range, the horizontal voltage is thereby made proportional to the horizontal plane to target distance and its rate of decrease is proportional to the plane's ground speed.

The operative procedure to be followed with the apparatus of the invention is first, with switches S, S' and S" thrown upward, to set tap 109, Fig. 4, to make line RL, Fig. 10A, intersect spot T. Switches S, S' and S" are then thrown downward and tap 82 on potentiometer 81 is adjusted so to control the rate of decrease of the voltage from generator 180 that line RL (in Fig. 10B) continues to intersect spot T. Potentiometer 81 is calibrated in suitable speed units whereby the position of tap 82 is read as the ground speed of the airplane. To read slant range directly, meter M in Fig. 4 may be calibrated in range units.

The geometrical relationship involved and the slant range voltage supplied to amplifier 110 are respectively exhibited by Figs. 9A and 9B, of which the former illustrates the flight of the attacking plane toward the target below, while the latter shows the variation with time of the slant range voltage from the moment of initial adjustment of tap 109 to the moment the airplane is directly above the target.

While the invention has been described as to both method and apparatus with reference to a situation in which the target range is continually decreasing, it is within the skill of the art to invert the decreasing voltage from generator 80 to obtain an increasing voltage, thereby applying the invention to measure ground speed in recession as well as in approach. Inasmuch as the alternating voltage representing altitude may be zero, the system disclosed is useful for surface vessels as well as for aircraft.

What is claimed is:

1. A system of apparatus for measuring the speed of an airplane flying at a known altitude above a reference surface on which is located an object observable in the direction of flight including electrical means for continuously indicating the range of the object, a source of alternating voltage of constant amplitude providing a pair of alternating voltages in quadrature with each other, a source of unidirectional voltage decreasing linearly with time at a controllable rate, means for fractionating one voltage of the pair proportionally to the altitude, means for fractionating the other voltage of the pair continuously proportionally to the decreasing voltage, means for summing vectorially the fractional voltages and means for controlling the rate of decrease of the decreasing voltage to make the vector sum continuously proportional to the range.

2. A system of apparatus for measuring the horizontal speed of a craft moving toward an observed target and at a known altitude above the target comprising electrical means for continuously indicating the range of the target, a source of alternating voltage, circuit means including a resistance and a condenser in series for deriving from said source a first alternating voltage across the resistance in quadrature with a second alternating voltage across the condenser, means for fractionating one of the alternating voltages proportionally to the altitude, a source of unidirectional voltage decreasing linearly with time at a controllable rate, means for modulating in amplitude the other of the alternating voltages continuously proportionally to the unidirectional voltage, means for summing the fractionated and the modulated alternating voltages to obtain a third alternating voltage proportional to their vector sum, means for rectifying said third alternating voltage, means for continuously comparing said rectified voltage with the indicated range and means for controlling the rate of decrease of the unidirectional voltage to make said rectified voltage continuously proportional to the indicated range whereby the rate of decrease so controlled is made proportional to said horizontal speed.

3. For a vessel in motion relatively to an observed object at a known difference in vertical elevation relative to the vessel, a system of apparatus for measuring the horizontal speed of the vessel relative to the object comprising means for continuously indicating the distance between the vessel and the object, a source of alternating voltage, circuit means for deriving from said source a pair of alternating voltages in quadrature with each other, means for fractionating one voltage of the pair proportionally to the difference in elevation, a source of unidirectional voltage varying linearly with time at a controllable rate, means for modulating in amplitude the other voltage of the pair continuously proportionally to the unidirectional voltage, means for summing vectorially the fractionated and the modulated voltages to obtain a third alternating voltage, means for rectifying the third voltage, means for continuously comparing the rectified voltage with the indicated range anad means for controlling the rate of time variation of the unidirectional voltage to make the rectified voltage continuously proportional to the range whereby said rate of time variation is made proportional to the horizontal speed to be measured.

4. For a vessel in motion relatively to an observed object at a known difference in vertical elevation relative to the vessel, a system of apparatus as in claim 3 for measuring the horizontal speed of the vessel relative to the object including means for rendering the amplitude of the modulated other voltage independent of variation in frequency of the voltage derived from the source of alternating voltage, said means comprising means for deriving a second unidirectional voltage of amplitude proportional to the amplitude of said modulated voltage and normally continuously equal to said linearly varying unidirectional voltage, means for continuously comparing said second voltage with said linearly varying voltage and means for controlling said modulating means in accordance with the difference of said second of said linearly varying voltages.

5. For a vessel moving relatively to an object at a known difference in elevation with respect to the vessel, a system of apparatus for measuring the horizontal speed of the vessel relative to the object comprising means for indicating continuously the range from the vessel to the object, means for generating a first alternating voltage of amplitude representing the difference in elevation, means for generating a second alternating voltage in quadrature with the first voltage, means for varying the second voltage at a controllable rate linearly with time, means for summing vectorially said first and second voltages and means for controlling the rate of variation of the second voltage with time to make the vector sum of said voltages continuously proportional to the range.

No references cited.